United States Patent [19]

Sarson

[11] Patent Number: 4,676,269

[45] Date of Patent: Jun. 30, 1987

[54] CONNECTOR ASSEMBLY

[75] Inventor: Charles R. Sarson, Willoughby Hills, Ohio

[73] Assignee: Tuthill Corporation, Cleveland, Ohio

[21] Appl. No.: 837,521

[22] Filed: Mar. 7, 1986

[51] Int. Cl.$^4$ ............................................. F16L 37/28
[52] U.S. Cl. .............................. 137/614.06; 285/316; 285/924
[58] Field of Search .......................... 137/614.06, 614; 285/306, 316, 106, 924

[56] References Cited

U.S. PATENT DOCUMENTS

| 1,681,597 | 8/1928 | Sanford | 137/630.22 |
|---|---|---|---|
| 3,348,575 | 10/1967 | Simak | 137/614.06 |
| 3,409,045 | 11/1968 | Mackey et al. | 285/316 |
| 3,646,965 | 3/1972 | Swartz | 137/614.06 |
| 3,680,591 | 8/1972 | Vik | 137/614.05 |
| 3,710,823 | 1/1973 | Vik | 137/614.06 |
| 4,009,725 | 3/1977 | Vik | 137/614.05 |
| 4,181,150 | 1/1980 | Maldavs | 137/614.06 |
| 4,240,466 | 12/1980 | Herzan et al. | 137/614.04 |
| 4,483,510 | 11/1984 | Palau et al. | 251/149.6 |
| 4,546,956 | 10/1985 | Moberg | 285/316 |

Primary Examiner—A. Michael Chambers
Attorney, Agent, or Firm—Tarolli, Sundheim & Covell

[57] ABSTRACT

A socket assembly has a socket body into which a plug assembly is insertable to either a partially engaged position or a fully engaged position. When the plug assembly is in the fully engaged position, a seal engages a leading end of the plug assembly to block the leakage of fluid. When the plug assembly is in a partially engaged position, the leading end of the plug assembly is separate from the seal to enable fluid to be vented from the socket assembly. A plurality of locking elements are movable between a disengaged or release condition in which the locking elements are ineffective to hold the plug assembly in the socket assembly, a partially engaged condition in which the locking elements hold the plug assembly in its partially engaged position in which fluid can be vented from the socket assembly, and a fully engaged condition in which the locking elements hold the leading end of the plug assembly in engagement with the seal. An actuator assembly is operable, when the plug assembly is in the fully engaged position and the locking elements are in a fully engaged condition, to open a check valve in the plug assembly to enable fluid to flow between the plug and socket assemblies.

9 Claims, 11 Drawing Figures

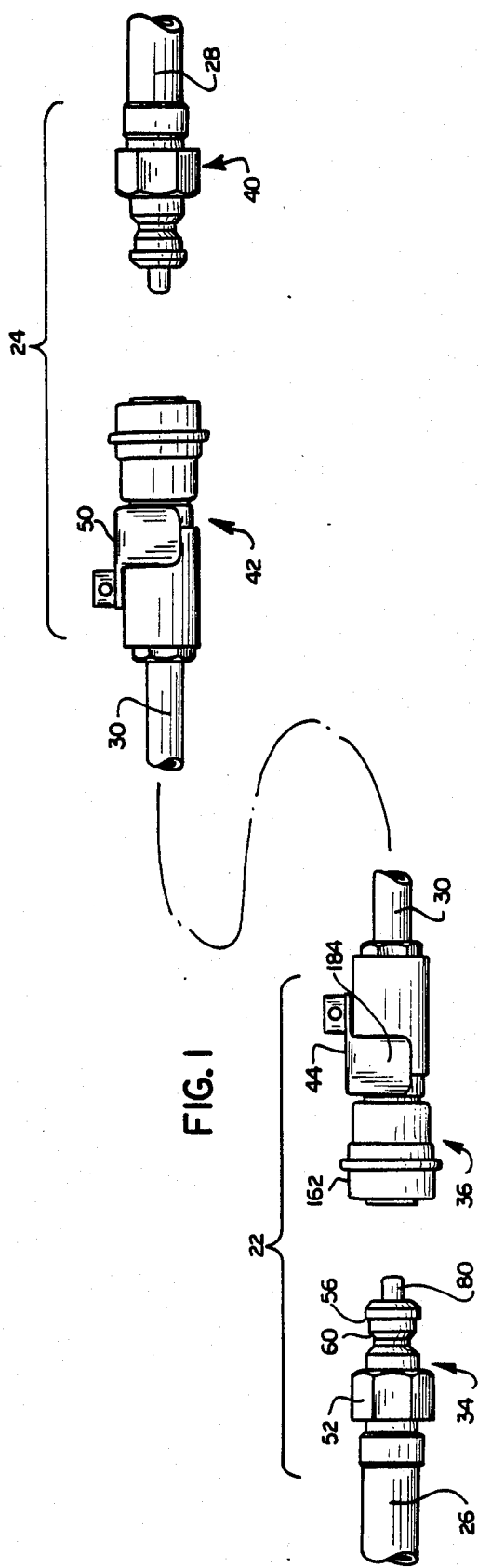

CONNECTOR ASSEMBLY

BACKGROUND OF THE INVENTION

The present invention relates to a new and improved connector assembly for use in connecting a pair of conduits in fluid communication.

It has been suggested that a relatively low fluid pressure in one tank of gas could be increased by connecting it in fluid communication with a tank containing gas at a relatively high fluid pressure. The suggested manner of doing this is by using an auxiliary or intermediate conduit having a socket assembly at each end of the conduit. To equalize the fluid pressure in the two tanks, the socket assemblies at the ends of the auxiliary conduit are connected with plugs which are in fluid communication with the tanks. When this has been done, check valves in the plugs are opened to connect the two tanks in fluid communication through the socket assemblies and auxiliary conduit.

The relatively high fluid pressure in one of the tanks may be as great as 4,500 p.s.i.g. Opening of the check valve in a plug assembly against this relatively high fluid pressure requires substantial force. After the fluid pressure in the two tanks has been equalized, the check valves in the plug assemblies are closed and the plug and socket assemblies are disconnected. The relatively high remaining fluid pressure in the socket assemblies tends to expel the plug assemblies from the socket assemblies with excessive force during disconnection of the plug and socket assemblies.

Due to the relatively large fluid pressure being conducted through the socket assemblies, it is important that the plug and socket assemblies are not accidentally disconnected. Thus, once the socket assemblies have been actuated to open the check valves in the plug assemblies, the plug and socket assemblies should not be disconnected until after the check valves have been closed.

A known connector assembly is disclosed in U.S. Pat. No. 4,009,729. This known connector assembly includes a plug assembly which is inserted into a socket assembly. When the plug assembly is inserted into the socket assembly, a check valve in the plug assembly is closed. Upon rotation of a handle in the socket assembly, a cam moves a pair of actuator balls to move the check valve from its closed position to its open position.

The cam and actuator balls of the socket assembly disclosed in U.S. Pat. No. 4,009,729 have a relatively limited operating stroke. In addition, a relatively small mechanical advantage can be obtained from the cam to force the check valve in the plug assembly open against relatively high fluid pressures.

Once the check valve in the plug assembly of U.S. Pat. No. 4,009,729 has been opened, the plug and socket assemblies can be accidentally disconnected by merely pulling back on a spring biased sleeve. Of course, this would result in a blowing apart of the plug and socket assemblies under the influence of relatively large fluid pressure forces. Even if the check valve in the plug assembly is closed before the plug and socket assemblies are disconnected, the relatively high pressure fluid remaining in the socket assembly would tend to blow the plug assembly from the socket assembly with excessive force.

SUMMARY OF THE PRESENT INVENTION

The present invention provides a new and improved connector assembly in which a plug assembly is inserted into a socket assembly to connect a pair of conduits in fluid communication. The plug assembly is held in the socket assembly by a plurality of locking elements which engage the plug assembly. An actuator in the socket assembly is operated to open a check valve in the plug assembly to enable relatively high fluid pressures to be conducted through the plug and socket assemblies. Once the check valve in the plug assembly has been opened, the locking elements are maintained in engagement with the plug assembly to prevent accidental disengagement of the plug and socket assemblies.

When the plug and socket assemblies are to be disconnected, the actuator in the socket assembly is operated back to its initial condition to effect a closing of the check valve in the plug assembly. Once this has happened, the locking elements are actuated to a partially disengaged condition. This releases the plug assembly for movement through a short distance to disengage it from a seal. Disengagement of the plug assembly from the seal vents the fluid pressure in the socket assembly to the atmosphere.

Once the fluid pressure in the socket assembly has been reduced, the locking elements can be actuated to a fully disengaged or release condition. This enables the plug assembly to be withdrawn from the socket assembly. Since the relatively high fluid pressure in the socket assembly must be vented before the plug assembly is withdrawn from the socket assembly, excessive fluid forces cannot blow the plug assembly from the socket assembly.

Accordingly, it is an object of this invention to provide a new and improved connector assembly for connecting a pair of conduits in fluid communication and wherein the connector assembly includes a socket assembly having an actuator which is easily operated to open a check valve in a plug assembly against the influence of relatively high fluid pressures.

Another object of this invention is to provide a new and improved connector assembly in which a plug assembly is inserted into a socket assembly to connect a pair of conduits in fluid communication and wherein disengagement of the plug assembly from the socket assembly is blocked until the fluid pressure in the socket assembly has been reduced.

Another object of this invention is to provide a new and improved connector assembly in which a plug assembly is inserted into a socket assembly and a check valve in the plug assembly is opened to enable relatively high fluid pressures to be conducted through the plug and socket assemblies and wherein the plug and socket assemblies cannot be accidentally disconnected while the check valve is open.

BRIEF DESCRIPTION OF THE DRAWINGS

The foregoing and other features and advantages of the present invention will become apparent to those skilled in the art to which it relates upon a consideration of the following description taken in conjunction with the accompanying drawings, wherein:

FIG. 1 is a schematic illustration depicting a pair of connector assemblies constructed in accordance with the present invention and used to connect a pair of conduits in fluid communication;

FIG. 2 is a sectional view of a plug assembly used in one of the connector assemblies of FIG. 1;

FIG. 3 is a sectional view, taken generally along the line 3—3 of FIG. 2, illustrating the construction of a check valve in the plug assembly;

DESCRIPTION OF SPECIFIC PREFERRED EMBODIMENTS OF THE INVENTION

GENERAL DESCRIPTION

Figure 4:
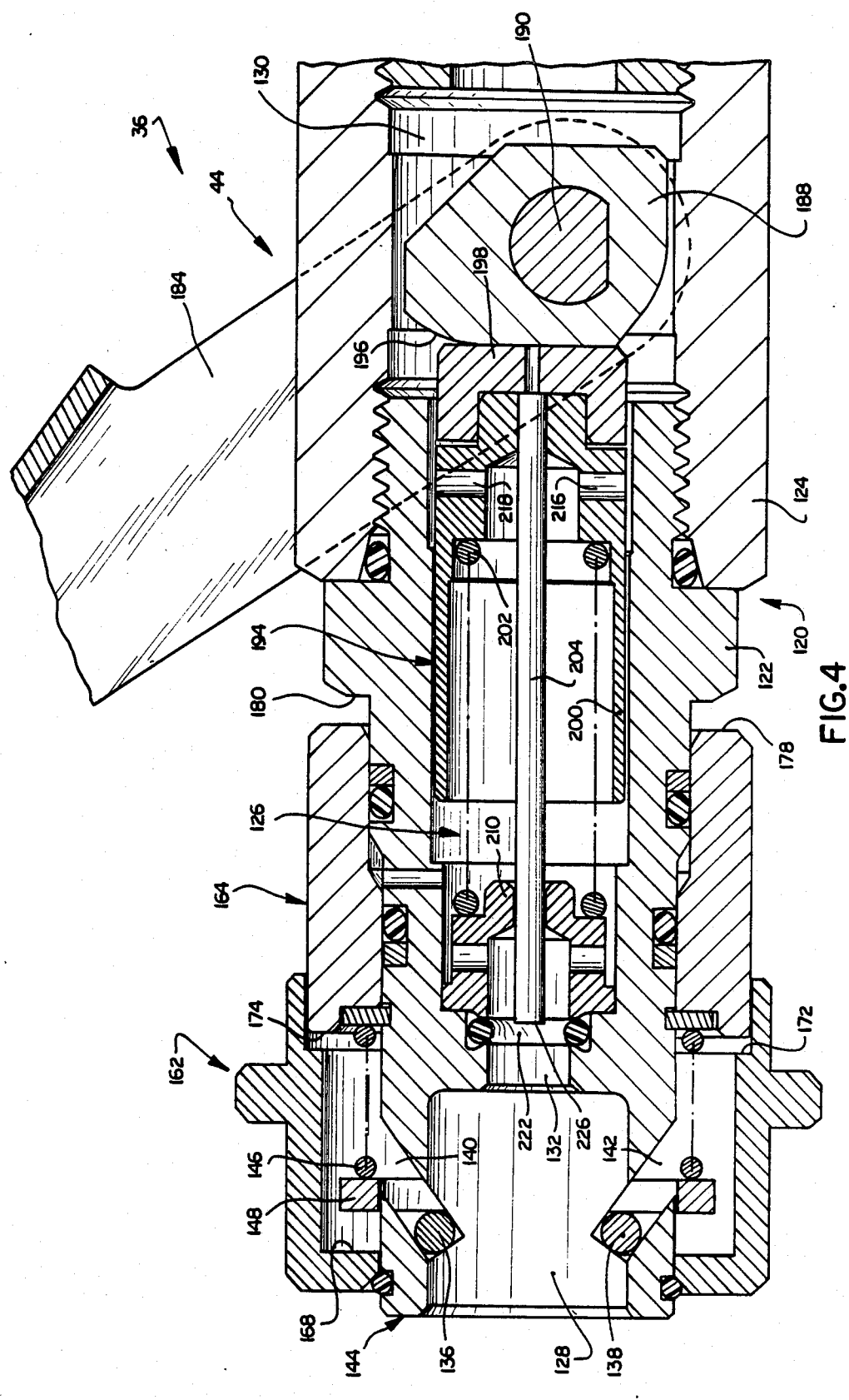
FIG. 4 is a sectional view of a socket assembly in one of the connector assemblies of FIG. 1 prior to insertion of a plug assembly into the socket assembly.

A pair of connector assemblies 22 and 24 (FIG. 1), constructed in accordance with the present invention, are used to connect a pair of conduits 26 and 28 in fluid communication through an auxiliary or intermediate conduit 30 when the fluid pressure in a pair of tanks is to be equalized. Thus, the conduit 26 is connected with a tank containing fluid at a relatively high pressure. The conduit 28 is connected with a tank containing fluid at a relatively low pressure. The conduits 26 and 28 could be formed as passages in a housing or manifold block if desired.

When the fluid pressures in the two tanks are to be equalized, a plug assembly 34 connected with the conduit 26 is inserted into a socket assembly 36 connected with the auxiliary conduit 30. Similarly, a plug assembly 40 connected with the conduit 28 is inserted into a socket assembly 42. After this has been done, an actuator assembly 44 (see FIGS. 1 and 4) in the socket assembly 36 is actuated to open a check valve 46 (FIG. 2) in the plug assembly 34.

Once the check valve in the plug assembly 34 has been opened, fluid flows from the high pressure tank through the conduit 26, connector assembly 22, auxiliary conduit 30, connector assembly 24 and conduit 28 to the low pressure tank. An actuator 50 in the socket assembly 42 does not have to be operated to open a check valve in the plug assembly 40. The check valve in the plug assembly 40 is opened by the high fluid pressure conducted through the conduit 30. The socket assembly 42 is provided with the actuator 50 to enable either the socket assembly 36 or the socket assembly 42 to be connected with the plug assembly 34.

When the fluid pressure in the tanks has substantially equalized, the actuator 44 in the socket assembly 36 is operated to close the check valve in the plug assembly 34. After the check valve in the plug assembly 34 has closed, the plug assemblies can be withdrawn from the socket assemblies 36 and 42.

It is contemplated that there may be a relatively high fluid pressure in the tank connected with the conduit 26. For example, the high pressure tank could contain fluid at a pressure of 4,500 pounds per square inch gauge, before the fluid pressures in the two tanks are equalized. Due to the relatively high fluid pressures being conducted from the conduit 26 to the conduit 28, it is necessary to prevent inadvertent disconnection of one of the connector assemblies 22 or 24 before the check valves in the plug assemblies 34 and 40 have been closed. In addition, it is desirable to vent the fluid pressure remaining in the socket assemblies 36 and 42 and auxiliary conduit 30 before disconnecting the connector assemblies 22 and 24. If the connector assemblies 22 and 24 were disconnected while a relatively high fluid pressure was being conducted from the conduit 26 to the conduit 28 or prior to venting of the fluid pressure in the socket assemblies 36 and 42, the plug and socket assemblies would tend to be blown apart with excessive force under the influence of the fluid pressure.

Although the connector assemblies 22 and 24 have been described in conjunction with a system in which the fluid pressures in a pair of tanks are to be equalized, it is contemplated that the connector assemblies could be used in other environments if desired. It should be understood that the present invention is directed to the construction of the connector assemblies 22 and 24. The specific system with which the connector assemblies are used is not a feature of the present invention.

PLUG ASSEMBLY

The plug assembly 34 (FIG. 2) includes a metal plug body 52 having a leading end portion 54 which is telescopically inserted into the socket assembly 36 and a trailing end portion 56 which is connected with the conduit 26. The leading end portion 54 of the plug body 52 is provided with a pair of coaxial annular stop surfaces 58 and 60. The axially outer or first stop surface 58 has an inside diameter which is equal to the outside diameter of the axially inner or second stop surface 60.

The check valve 46 is disposed in a cylindrical plug chamber 62 which is coaxial with the stop surfaces 58 and 60. The check valve 46 includes a generally rectangular valve body 64 (FIG. 3). The metal valve body 64 has a conical nose portion 66 (FIG. 2) which sealingly engages a conical valve seat 68 disposed on a cylindrical polymeric insert 70 when the check valve 46 is in the closed condition of FIG. 2. A cylindrical metal sleeve 71 engages one end of the insert 70 to hold the insert against movement relative to the plug body 52.

A cylindrical actuator rod 72 extends axially outwardly from the valve body 64 into a cylindrical passage 74 formed in the plug body 52. The outer or leading end 76 of the metal actuator rod 72 is disposed just inwardly from an annular end surface 78 on a cylindrical nose 80 of the plug body 52.

The generally rectangular valve body 64 has arcuate corners 84, 86, 88, and 90 (FIG. 3) which are disposed between flat sides 92, 94, 96 and 98 on the valve body. The arcuate corners 84–90 slidingly engage a cylindrical inner surface 102 of the valve chamber 62 to guide movement of the valve body 64 between the closed position shown in FIGS. 2 and 8 and the open position of FIG. 9. The valve body 64 is urged toward the closed position by a biasing spring 104 (FIG. 2).

Figure 9:
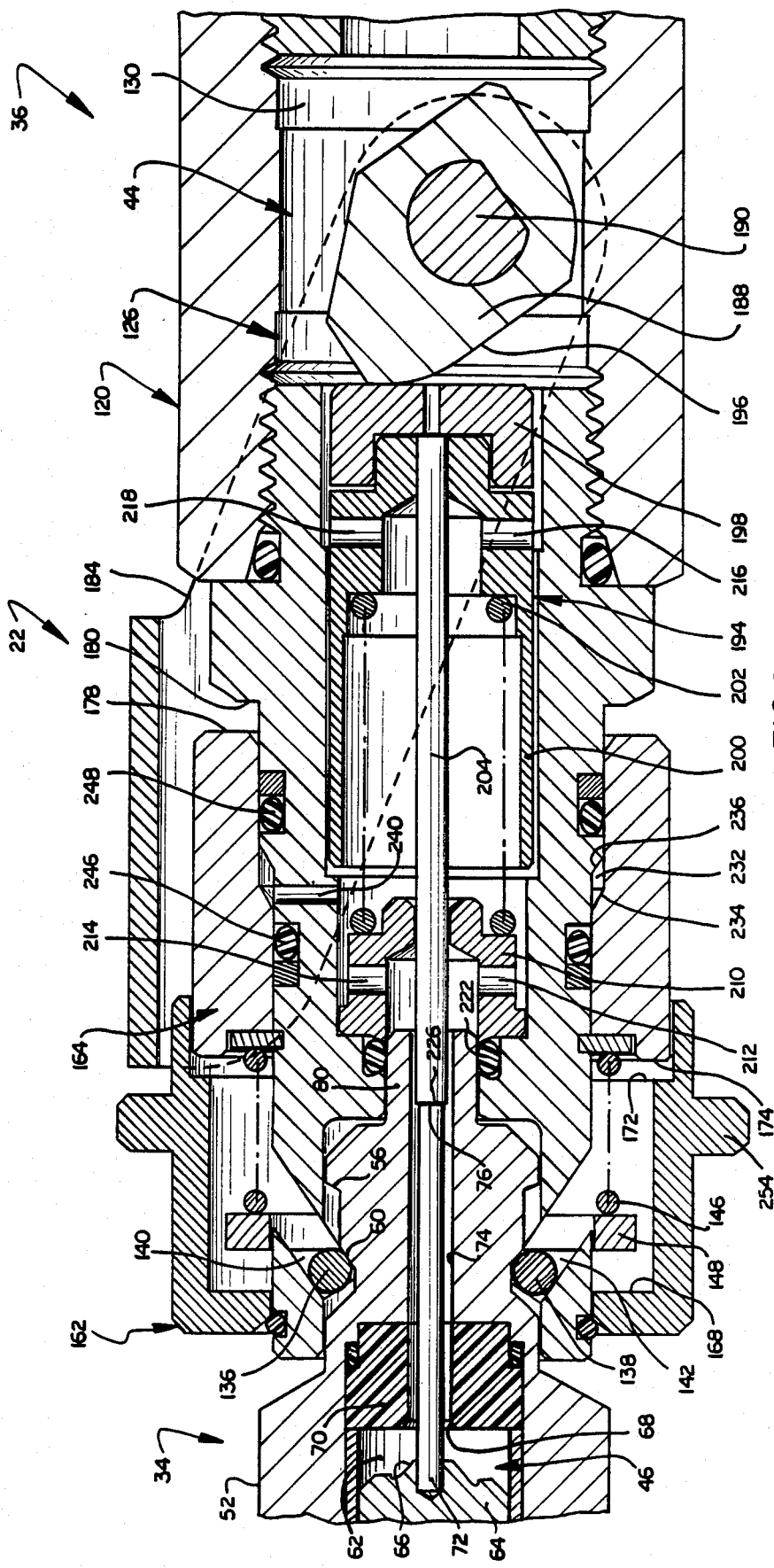
FIG. 9 is a sectional view illustrating the manner in which the check valve in the plug assembly of FIG. 8 is opened by an actuator in the socket assembly.

When the valve body 64 is in the open position of FIG. 9, fluid can flow from the chamber 62 (FIG. 2) in the plug body 52 into a cylindrical cavity 106 in the valve body 64. The fluid flows from the cavity 106 through passages 108 and 110 (FIG. 3). The fluid then flows along the flat side surfaces 94 and 98 of the plug body to the open valve seat 68. Fluid flows out of the plug assembly 34 between the cylindrical outer side surface of the actuator rod 72 and the cylindrical inner surface of the passage 74. When the valve body 64 is in the closed position of FIG. 2, the valve body sealingly engages the valve seat 68 to block fluid flow through the plug assembly 34.

SOCKET ASSEMBLY

The socket assembly 36 includes a metal socket body 120 (FIG. 4) which, in the illustrated embodiment of the invention, has a leading portion 122 and a trailing portion 124 which are fixedly interconnected. A socket chamber 126 is formed in the socket body and includes a cylindrical plug receiving section 128. The plug receiving section 128 of the socket chamber 126 is connected with a larger actuator section 130 through a cylindrical passage 132.

Figure 5:
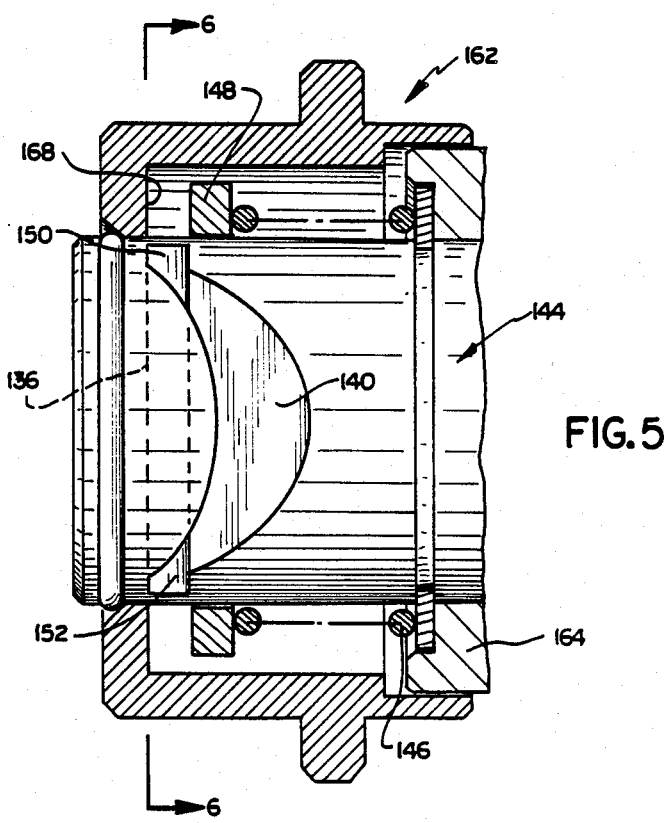
FIG. 5 is a fragmentary sectional view of a portion of the socket assembly and illustrating the manner in which a locking element is mounted on a socket body.
Figure 6:
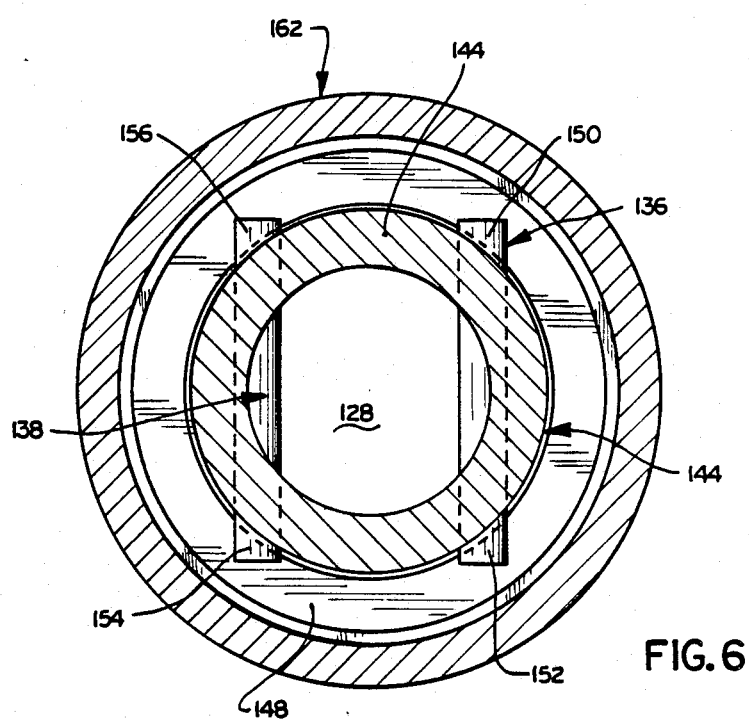
FIG. 6 is a sectional view, taken generally along the line 6—6 of FIG. 5, further illustrating the manner in which locking elements are mounted on the socket body.

A plurality of locking elements or pins 136 and 138 (FIGS. 4, 5 and 6) are engageable with either one of the stop surfaces 58 or 60 (FIGS. 9 and 10) on the plug body 52 to hold the plug assembly 34 in the socket chamber 126 (FIG. 4). The cylindrical metal locking pins 136 and 138 are slidably mounted in slots 140 and 142 formed in a leading end portion 144 of the socket body 120 (FIGS. 4, 5 and 6). The locking pins 136 and 138 extend chordally across portions of the plug receiving section 128 of the socket chamber 126 (see FIG. 6).

Figure 8:
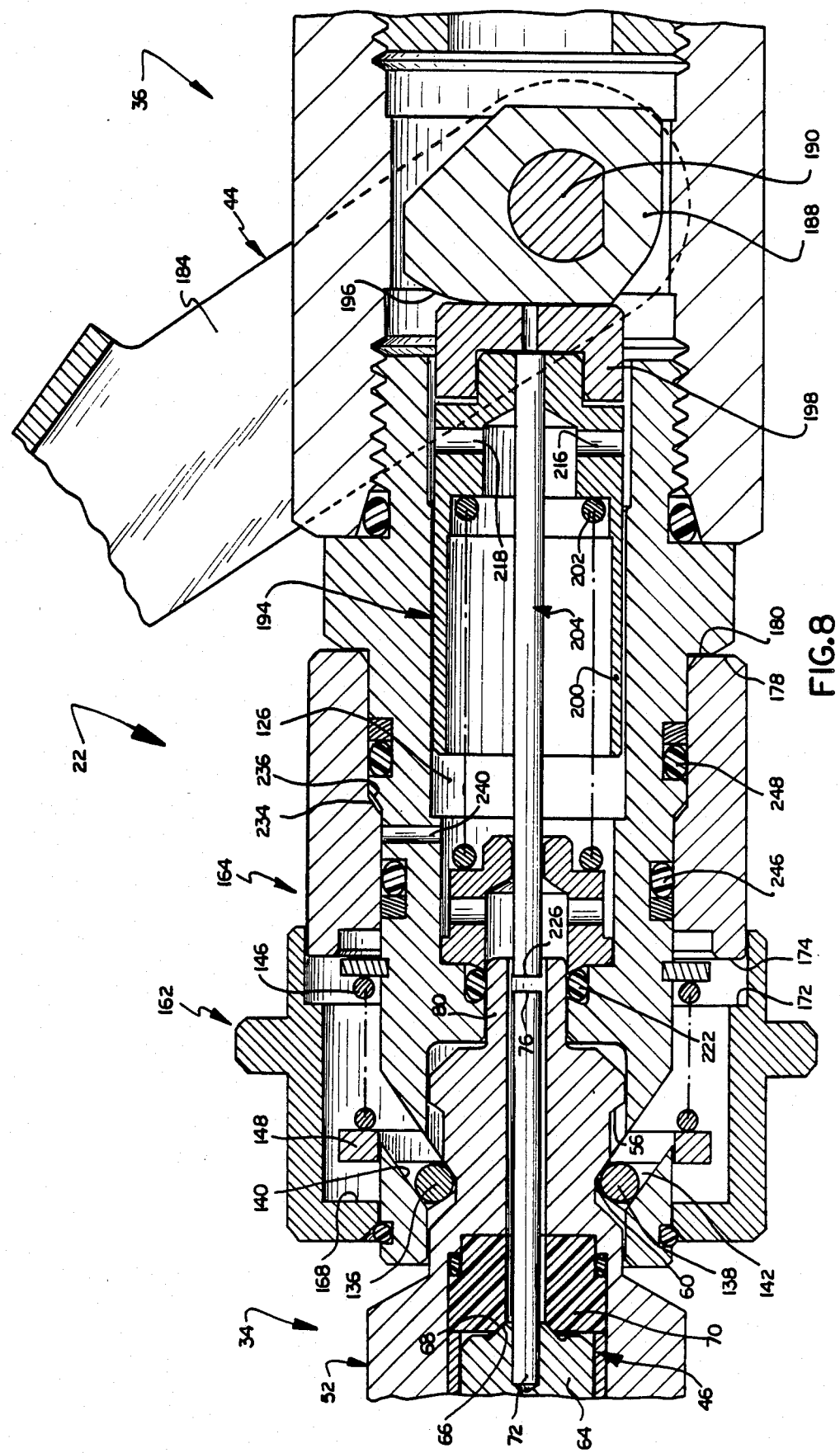
FIG. 8 is a sectional view illustrating the engagement of a plug assembly by the locking elements with the plug assembly fully inserted into the socket assembly and a check valve in the plug assembly closed.

When the plug assembly 34 is disconnected from the socket assembly 36 (FIG. 4) and when the plug assembly is fully inserted into the socket assembly (FIG. 8), the locking pins 136 and 138 are urged to fully engaged positions by a spring 146 which presses against a ring 148 (FIGS. 4 and 8). The annular metal ring 148 is pressed against outer end portions 150, 152, 154 and 156 (FIG. 6) of the locking pins 136 and 138 by the biasing spring 146 (see FIGS. 4 and 5). The locking pins 136 and 138 are urged toward the ends of the slots 140 and 142 by the ring 148 and spring 146. When the plug assembly 34 is fully inserted into the socket chamber 126 (FIG. 8), the locking pins 136 and 138 engage the stop surface 60 on the plug body 52.

The cylindrical locking pins 136 and 138 are movable outwardly in the slots 140 and 142 from the engaged position (FIG. 8) to a partially engaged position (FIG. 10) in which the locking pins engage the stop surface 58 on the plug body 52. When the locking pins 136 and 138 are in the partially engaged position of FIG. 10, the plug assembly 34 is only partially inserted into the socket chamber 126. Therefore, fluid can leak between the plug body 54 and the inner surface of the socket chamber 126 to vent the socket chamber to the atmosphere.

Figure 7:
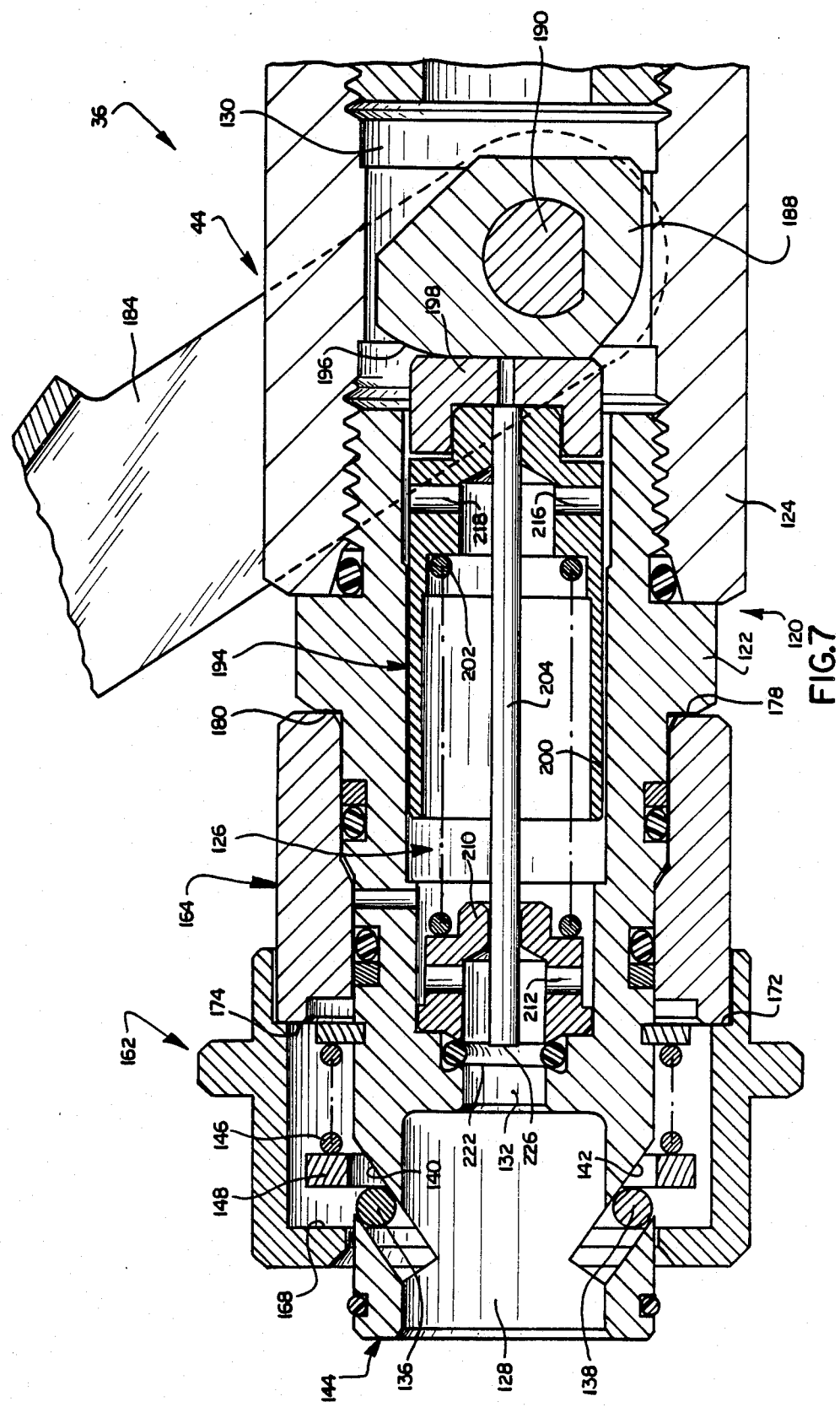
FIG. 7 is a sectional view, generally similar to FIG. 4, illustrating the socket assembly with the locking elements of FIGS. 5 and 6 in a disengaged condition prior to insertion of a plug assembly into the socket assembly.

The locking pins 136 and 138 can be moved still further outwardly in the slots 140 and 142 to the disengaged condition of FIG. 7. This moves the locking pins 136 and 138 radially outwardly of the stop surface 58 to release the plug assembly 34 for movement out of the socket chamber 126.

The plug assembly 34 can be inserted into the socket chamber 126 when the locking pins 136 and 138 are in the engaged condition of FIG. 4. Thus, as the plug assembly 34 is inserted into the socket chamber 126, an annular cam surface 160 (FIG. 2) on the plug body 52 engages the locking pins 136 and 138. Continued movement of the plug assembly 34 into the socket chamber 126 forces the locking pins rearwardly and outwardly from the engaged position of FIG. 4 to the disengaged position of FIG. 7 against the influence of the biasing spring 146. Once the plug assembly 34 has been inserted into the socket chamber 126, the biasing spring 146 returns the locking pins 136 and 138 to the engaged condition of FIG. 8.

Figure 10:
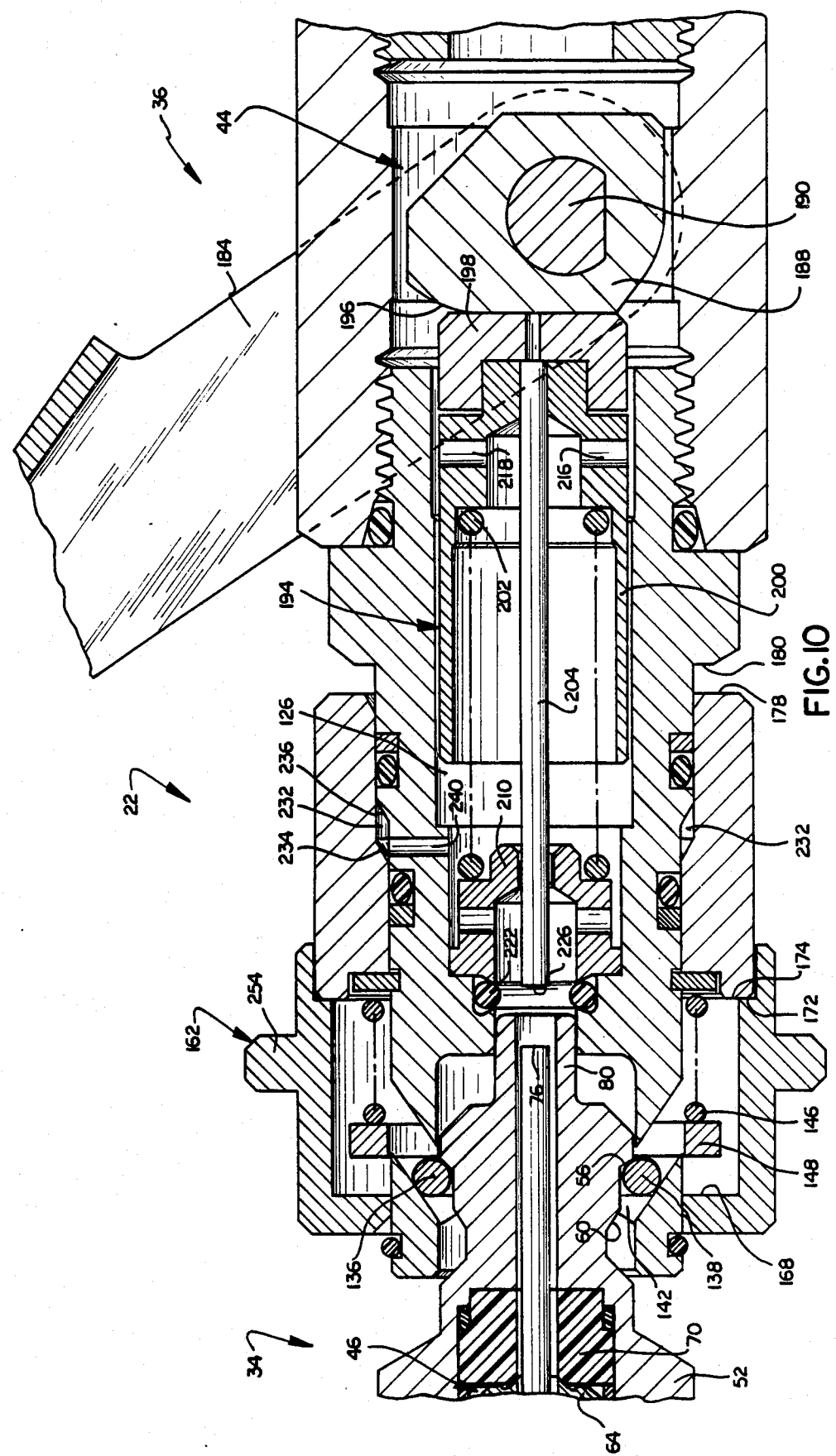
FIG. 10 is a sectional view illustrating the locking elements in a partially engaged condition and the plug assembly in a partially withdrawn position after a check valve in the plug assembly has closed.

Movement of the locking pins 136 and 138 between the engaged condition of FIGS. 4 and 8, the partially engaged condition of FIG. 10 and the disengaged condition of FIG. 7, is controlled by first and second stage sleeves 162 and 164. The cylindrical metal first stage sleeve 162 is coaxial with and is manually movable axially along the socket body 120 from an extended position (FIGS. 4 and 8) through a partially retracted position (FIG. 10) to a fully retracted position (FIG. 7).

Movement of the first stage sleeve 162 from the extended position (FIG. 8) to the partially retracted position (FIG. 10), moves the locking pins 136 and 138 from the engaged condition to the partially disengaged condition against the influence of the biasing spring 146. To move the locking pins 136 and 138, an annular inner surface 168 on the first stage sleeve 162 engages the end portions 150, 152, 154 and 156 (FIG. 6) of the pins 136 and 138 to pull them rearwardly against the ring 148 and biasing spring 146. When the first stage sleeve 162 is in its partially retracted position (FIG. 10) and the second stage sleeve 164 is in its extended position (FIG. 10), an annular surface 172 on the inside of the first stage locking sleeve is disposed in abutting engagement with an annular end surface 174 on the second stage locking sleeve 164.

Continued rearward movement of the first stage locking sleeve 162 moves both the first stage sleeve and the second stage locking sleeve 164 to their retracted positions (FIG. 7). When the second stage sleeve 164 reaches its retracted position, an annular end surface 178 on the second stage locking sleeve abuttingly engages an annular stop surface 180 formed on the socket body 120. As the first and second stage sleeves 162 and 164 are moved to their retracted positions, the locking pins 136 and 138 are moved outwardly in the slots 140 and 142 to the fully disengaged condition (FIG. 7).

The actuator 44 is operable to open the check valve 46 in the plug assembly 34 when the plug assembly has been fully inserted into the socket chamber 126 (FIG. 9). At this time, the locking pins 136 and 138 are in engagement with the stop surface 60 on the plug body 52. Therefore, the plug assembly is securely held in the socket chamber 126.

The actuator 44 includes a handle 184 which is manually pivotal from the initial position shown in FIG. 8 to the operated position shown in FIG. 9. This causes the check valve 46 to be actuated from the closed condition (FIG. 8) to the open condition (FIG. 9). The actuator 44 includes a metal cam 188 which is fixedly connected with a rotatable mounting shaft 190 and the handle 184.

Upon manual rotation of the handle 184, the mounting shaft 190 rotates the cam 188 to move a cylindrical cam follower 194 leftwardly from the initial position shown in FIG. 8 to the actuated position shown in FIG. 9. Thus, the cam 188 has an arcuate surface 196 which engages a metal cap 198 on a head end of the cam follower 194. Rotation of the cam 188 causes it to move the cam follower 194 toward the left (as viewed in FIGS. 8 and 9). This movement of the cam follower 194 is guided by a cylindrical metal wall 200 which slides along the inside surface of the socket chamber 126. The cam follower 194 is urged toward the initial position (FIG. 8) by a biasing spring 202.

As the cam follower 194 moves leftwardly from the initial position shown in FIG. 8 to the actuated position shown in FIG. 9, a circular end surface 226 on a cylindrical metal rod 204 engages the actuator rod 72 and moves the check valve body 64 from the closed position to the open position. This enables high pressure gas to flow from the conduit 26 through the open check valve 46 into a rod guide member 210. The circular metal rod guide member 210 is provided with a pair of radial passages 212 and 214 through which the fluid can flow into the interior of the hollow cam follower 194. The fluid then flows through radial passages 216 and 218 in the cylindrical head end portion of the cam follower 194. The high pressure fluid can then flow from the socket chamber 126 into the auxiliary conduit 30.

Although only the plug and socket asssemblies 34 and 36 have been illustrated in FIGS. 3–10, it should be understood that the plug and socket assemblies 40 and 42 have the same construction as the plug and socket assemblies 34 and 36. Thus, the plug assembly 40 contains a check valve corresponding to the check valve 46. The socket assembly 42 has locking pins and control sleeves which correspond to the locking pins 136 and 138 and control sleeves 162 and 164 of the socket assembly 36.

OPERATION

Prior to insertion of the plug assembly 34 into the socket assembly 36 (FIG. 1), the check valve 46 (FIG. 2) in the plug assembly 34 is closed so that there is no leakage of fluid from the plug assembly. At this time the locking pins or elements 136 and 138 in the socket assembly 36 are in the engaged condition (FIG. 4) and the first and second stage sleeves 162 and 164 may be in their fully extended positions. The actuator 44 urged to the initial or unoperated condition by the biasing spring 202.

As the plug assembly 34 is inserted into the socket assembly 36, the cam surface 160 engages the locking pins 136 and 138 and forces them rearwardly and outwardly from the engaged position of FIG. 4 to the disengaged position of FIG. 7. This moves the ring 148 rearwardly against the influence of the biasing spring 146. As this is being done, the first and second stage sleeves 162 and 164 remain stationary with the first stage sleeve 162 in the extended position shown in FIG. 4. Although the second stage sleeve 164 will probably be in the retracted position of FIG. 7, it is possible that the second stage sleeve 164 could be in the extended position of FIG. 4. Regardless of which position the second stage sleeve 164 is in, the plug assembly can be inserted into the socket chamber 126 without moving the sleeves 162 and 164.

It is contemplated that the plug assembly 34 will usually be inserted into the socket chamber 126 with the first stage sleeve 162 in the extended position shown in FIG. 4. However, the first stage sleeve 162 could be moved rearwardly to the retracted position of FIG. 7 to move the locking pins 136 and 138 to the disengaged position before the plug assembly 34 is inserted into the socket chamber. However, this requires an extra manual operation and it is believed that the plug assembly 34 will usually be pressed into the socket chamber 126 while the first stage sleeve 162 remains in the extended position of FIG. 4.

When the plug assembly 34 is in the socket chamber 126, the force of the biasing spring 146 against the ring 148 causes the locking pins 136 and 138 to move inwardly along the slots 140 and 142 from the disengaged condition (FIG. 7) to the engaged condition (FIG. 8). As this occurs, the locking pins 136 and 138 move into firm abutting engagement with a relatively small diameter stop surface 60 on the plug body 62. The locking pins 136 and 138 hold the plug assembly 34 in the socket chamber 126.

At this time, an annular seal ring 222 engages the cylindrical nose 80 of the plug body 52 to block leakage of fluid to the atmosphere along a path extending between the plug body and the socket body 120. The end surface 226 on the rod 204 is spaced from the end surface 76 on the check valve actuator rod 72. Therefore, the check valve 46 remains in the closed condition of FIG. 2 under the influence of the relatively high fluid pressure in the conduit 26 and the biasing spring 104.

Although only the manner in which the plug assembly 34 is inserted into the socket assembly 36 has been shown in FIGS. 4, 7 and 8, it should be understood that the plug assembly 40 (FIG. 1) is inserted into the socket assembly 42 in the same manner. The plug assemblies 34 and 40 are both inserted into the socket assemblies 36 and 42 before the actuator 44 in the socket assembly 36 is operated to open the check valve 64 in the plug assembly 34. There is no fluid flow through either the socket assembly 36 or the socket assembly 42 until both socket assemblies have been connected with their associated plug assemblies 34 and 40.

Once the plug assemblies 34 and 40 have been inserted into the socket assemblies 36 and 42, the actuator 44 is operated from the initial condition of FIG. 8 to the operated condition of FIG. 9 by manually rotating the handle 184. Rotation of the handle 184 rotates the cam 188 in a counterclockwise direction (as viewed in FIGS. 8 and 9) about the central axis of the mounting shaft 190. It should be noted that the central axis of the mounting shaft 190 extends perpendicular to and is offset downwardly (as viewed in FIG. 9) from the central axis of the socket assembly 36. This provides the cam 188 with a relatively long operating stroke through which to move the cam follower 194 from the initial position of FIG. 8 to the actuated position of FIG. 9.

As the cam 188 is rotated and the cam follower 194 moves from the initial position of FIG. 8 toward the operated position of FIG. 9, the end surface 226 of the rod 204 moves into abutting engagement with the end surface 76 on the check valve actuator rod 72. Continued rotation of the cam 188 moves the check valve actuator rod 72 and valve body 64 leftwardly (as viewed in FIGS. 8 and 9) to operate the check valve 46 from the closed condition of FIG. 8 to the open condition of FIG. 9.

Once the check valve 46 has been opened, fluid can flow around the check valve body 64, through the passage 74 in the plug body 52 and around the leading end of the rod 204 into the socket chamber 126. Fluid enters the socket chamber 126 rightwardly (as viewed in FIG.

9) of the seal ring 222. The fluid then flows through the passages 212 and 214 in the guide 210 into the cam follower 194. The fluid then flows through passages 216 and 218 in the head end portion of the cam follower 194 around the cam 188 and into the auxiliary conduit 30.

The high fluid pressure is transmitted through the conduit 30 and socket assembly 42 to the plug assembly 40. The high fluid pressure opens the check valve in the socket assembly 40 against the influence of the relatively low fluid pressure in the conduit 28. Fluid can then flow through the socket assembly 42 into the plug assembly 40. The fluid flows from the plug assembly 40 into the conduit 28 leading to the low pressure tank.

If the plug and socket assemblies 34 and 36 were disconnected while relatively high fluid pressure, for example 4,500 pounds per square inch gauge, was present in the socket chamber 126, the plug and socket assemblies would be blown apart by the relatively high fluid pressure. Therefore, it is necessary to prevent disconnection of the plug and socket assemblies 34 and 36 until after the fluid pressure in the socket chamber 126 has been reduced. To block disconnection of the plug and socket assemblies 34 and 36 while relatively high fluid pressure is present in the socket chamber 126, fluid pressure from the socket chamber is conducted to an annular pressure chamber 232 (FIG. 9) formed between an inner side surface 234 on the second stage sleeve 164 and an outer side surface 236 formed on the socket body 120. Thus, passage 240 extends radially outwardly through the socket body 120 to the annular pressure chamber 232.

When the plug assembly 34 was previously withdrawn from the socket assembly 36, the second stage sleeve was retracted (see FIG. 8). Therefore, the second stage sleeve 164 will probably be in the retracted position of FIG. 8 when the plug assembly 34 is inserted into the socket assembly. Therefore, the pressure chamber 232 is contracted and the annular surface 234 on the sleeve is adjacent the annular surface 236 of the socket body (FIG. 8). Opening the plug check valve 46 causes the fluid pressure in the socket chamber 126 to increase.

The increased fluid pressure in the socket chamber 126 is transmitted through the passage 240 to the contracted annular chamber 232 and is applied against the surfaces 234 and 236. Fluid pressure forces then move the second stage sleeve 164 from the retracted position of FIG. 8 to the extended position of FIG. 9. A pair of annular O-rings 246 and 248 are provided between the inside of the second stage sleeve 164 and the outside of the socket body 120 to prevent the leakage of fluid from the chamber 232.

When the second stage sleeve 164 is in the extended position of FIG. 9, the second stage sleeve blocks movement of the first stage sleeve 162 to the fully retracted position of FIG. 7. Thus, if the first stage sleeve 162 is pulled rearwardly toward the second stage sleeve 164, the surface 172 on the inside of the first stage sleeve 162 moves into abutting engagement with the surface 174 on the second stage sleeve 164. Since there is a relatively high fluid pressure in the annular pressure chamber 232, the fluid pressure against the surface 234 provides sufficient force on the second stage sleeve 164 to block movement of the first stage sleeve 162 to the fully retracted position. This allows the plug assembly 34 to only move through the short distance from the fully engaged position of FIG. 9 to the partially engaged position of FIG. 10. Therefore, an inadvertent disconnection of the plug assembly 34 from the socket assembly 36 is prevented.

To further prevent accidental disconnection of the connector assembly 22 when the check valve 34 is open, the handle 184 of the actuator is disposed adjacent to an annular rim 254 (FIG. 9) on the first stage sleeve 162. Therefore, the actuator handle 184 blocks movement of the first stage sleeve 162 to the fully retracted position of FIG. 7 when the actuator 44 is in the operated condition of FIG. 9. Thus, the first stage sleeve 162 can be moved from the extended position of FIG. 9 to the fully retracted position of FIG. 7 only when the actuator 44 is in the initial condition shown in FIG. 7 with the handle 184 out of the path of movement of the rim 254 of the first stage sleeve 162.

In order to maintain the actuator 44 in the operated condition of FIG. 9, it is necessary to manually hold the handle 184 in the operated or depressed position of FIG. 9. Upon releasing the handle 184, the cam 188 is rotated by the force of the biasing spring 202 against the cam follower 194. The cam follower 194 presses against an arcuate surface on the cam 188 at a location which is offset from the central axis of the mounting shaft 190. Therefore, the force applied by the cam follower 194 against the cam 188 rotates the cam in a clockwise direction from the operated position of FIG. 9 to the initial position of FIG. 8. As this occurs, the cam follower rod 204 moves toward the right (as viewed in FIGS. 8 and 9) to enable the check valve 46 to close. The actuator 44 is maintained in the unoperated condition of FIG. 8 by the spring 202 until the handle 184 is again manually depressed.

The first stage sleeve 162 is then moved to a partially retracted position (FIG. 10). Fluid pressure in the socket chamber 126 moves the plug assembly 34 to the partially disengaged position (FIG. 10). Since the plug body 52 has moved out of engagement with the seal ring 222, the fluid pressure in the socket chamber 126 is conducted between the plug and socket bodies 52 and 120 to the atmosphere.

Once the fluid pressure in the socket chamber 126 has been reduced, the fluid pressure in the annular chamber 232 will have been reduced. Therefore, the first stage sleeve 162 and the second stage sleeve 164 can be pulled rearwardly, that is toward the right as viewed in FIG. 10, to their retracted positions (FIG. 7). This releases the plug assembly 34 for disconnection from the socket assembly 36.

When the plug assembly 34 is in the partially disengaged position of FIG. 10, the check valve 46 is closed. If the check valve 46 were opened with the plug assembly 34 in the partially engaged position of FIG. 10, high pressure fluid could flow from the conduit 26 through the plug assembly. To prevent this from happening, operation of the actuator 44 with the plug assembly 34 in the partially disengaged condition is ineffective to open the check valve 46. Thus, the operating stroke of the cam follower 194 and rod 204 is slightly less than the distance between the end surface 226 of the cam follower rod and the end surface 76 of the check valve actuator rod 72 when the plug assembly 34 is in the partially engaged position of FIG. 10.

SECOND EMBODIMENT

In the embodiment of the invention shown in FIGS. 1–10, the second stage sleeve 164 is urged toward the extended position of FIGS. 8 and 9 by fluid pressure in the chamber 232. However, it is contemplated that it may be desirable to have the second stage sleeve 164 urged to the extended position by a spring. Accordingly, in the embodiment of the invention shown in FIG. 11, a spring is used to urge the second stage sleeve to the extended position. Since the embodiment of the invention shown in FIG. 11 is generally similar to the embodiment of the invention shown in FIGS. 1–10, similar numerals will be utilized to identify similar components, the suffix letter "a" being associated with the numerals of FIG. 11 to avoid confusion.

A connector assembly 22a includes a plug assembly 34a and a socket assembly 36a. The plug assembly 34a has the same construction as the plug assembly 34 of FIGS. 2 and 3. However, the socket assembly 36a differs from the socket assembly 36 of FIGS. 4–10 in that a second stage sleeve 164a is urged to the extended position shown in FIG. 11 by a coil spring 260 rather than by fluid pressure in a chamber, corresponding to the pressure chamber 232 of FIG. 9.

Figure 11:
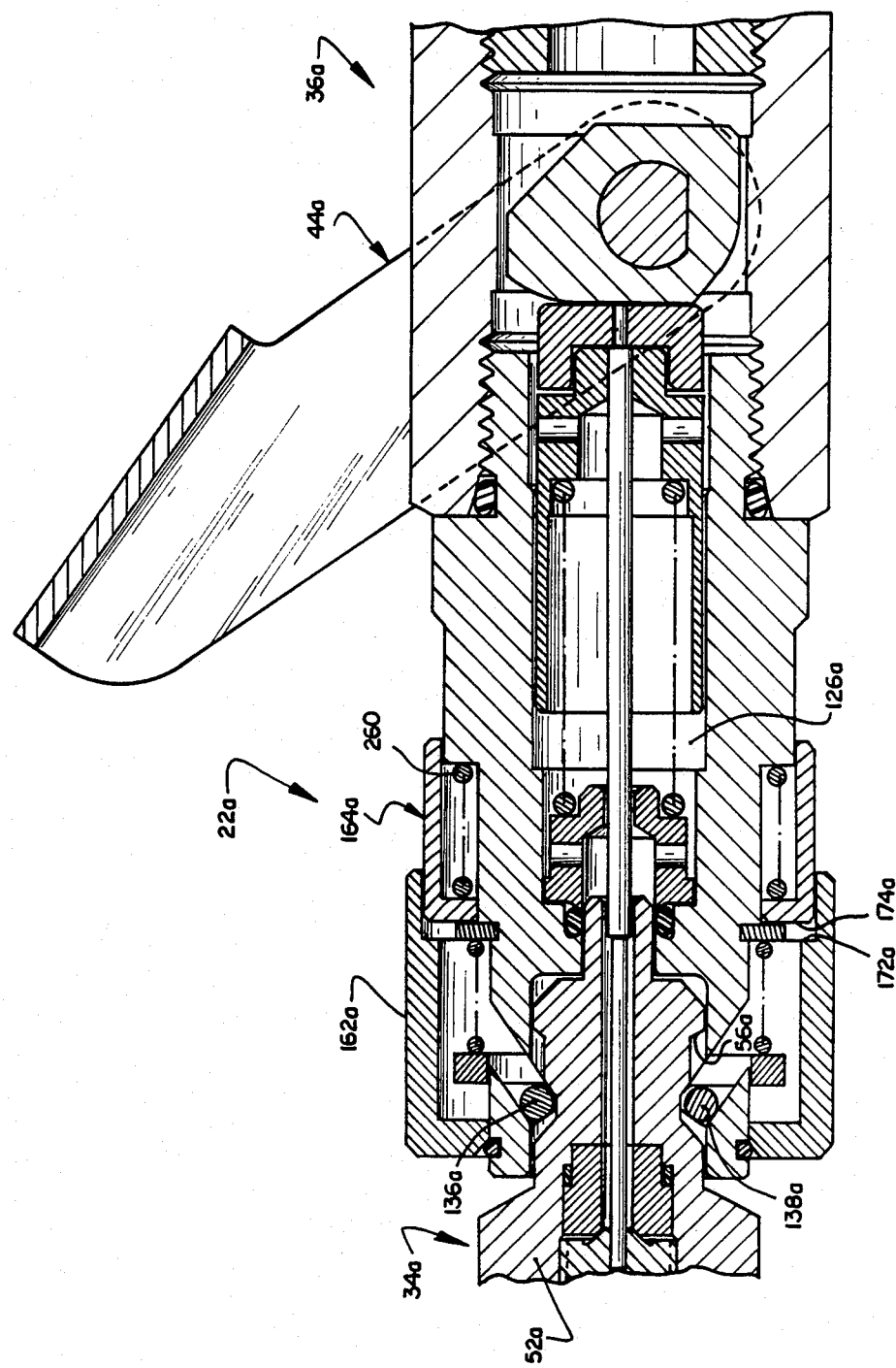
FIG. 11 is a sectional view of a second embodiment of the invention.

When the plug assembly 34a is to be disconnected from the socket assembly 36a, the actuator 44a is operated to the initial condition of FIG. 11. The first stage sleeve 162a can then be retracted until the surface 172a on the inside of the first stage sleeve 162a moves into abutting engagement with a surface 174a on the second stage sleeve 164a. When this occurs, locking elements 136a and 138a will have moved outwardly to the partially disengaged position shown in FIG. 10 for the locking elements 136 and 138. The plug assembly 34a will then be moved by fluid pressure to the partially disengaged position in which locking pins 136a and 138a engage stop surface 58a on the plug body 52a.

The first stage sleeve can then be further retracted by moving the second stage sleeve rearwardly against the influence of the biasing spring 260. As this occurs, the locking pins 136a and 138a are moved to a fully disengaged position. Since it is possible to manually pull the first stage sleeve 162a and the second stage sleeve 164a to release the plug assembly 134a while there is fluid pressure in the socket chamber 126a, there may be a tendency for the plug assembly 34a to be blown away from the socket assembly 36a by the fluid pressure in the socket chamber.

CONCLUSION

In view of the foregoing description, it is apparent that the present invention provides a new and improved connector assembly 22 in which a plug assembly 34 is inserted into a socket assembly 36 to connect a pair of conduits 26 and 30 in fluid communication. The plug assembly 34 is held in the socket assembly 36 by a plurality of locking elements 136 and 138 which engage a stop surface 60 (FIG. 9) on the plug assembly. An actuator 44 in the socket assembly 36 is operated to open a check valve 46 in the plug assembly 34 to enable relatively high fluid pressures to be conducted through the plug and socket assemblies. Once the check valve 46 in the plug assembly 34 has been opened, the locking elements 136 and 138 are maintained in engagement with the plug assembly to prevent accidental disengagement of the plug and socket assemblies (FIG. 9).

When the plug and socket assemblies 34 and 36 are to be disconnected, the actuator 44 in the socket assembly 36 is operated back to its initial condition (FIG. 8) to effect a closing of the check valve 46 in the plug assembly. Once this has happened, the locking elements 136 and 138 are actuated to a partially disengaged condition (FIG. 10) by retracting sleeve 162 to release the plug assembly 34 for movement out of engagement with a seal 222. This allows the fluid pressure in the socket assembly 34 to be vented to the atmosphere.

Once the fluid pressure in the socket assembly 36 has been reduced, the locking elements 136 and 138 can be actuated to a fully disengaged or release condition (FIG. 7). This enables the plug assembly 34 to be withdrawn from the socket assembly 36. Since the relatively high fluid pressure in the socket assembly 36 must be vented before the plug assembly 34 is withdrawn from the socket assembly, excessive fluid forces cannot blow the plug assembly from the socket assembly.

Having described specific preferred embodiments of the invention, the following is claimed:

1. A connector assembly for use in connecting a pair of conduits in fluid communication, said connector assembly comprising a plug assembly, said plug assembly including a plug body having a leading end portion and a trailing end portion adapted to be connected with one of the conduits, said leading end portion of said plug body having first and second annular stop surfaces which are axially spaced apart, said second annular stop surface being disposed at a location between said first stop surface and said trailing end portion of said plug body and having an outside radius which is smaller than the outside radius of said first annular stop surface, and a check valve disposed in said plug body, said check valve being operable between a closed condition blocking fluid flow through said plug body and an open condition in which said check valve is ineffective to block fluid flow through said plug body, and a socket assembly having a socket chamber which receives said leading end portion of said plug body and is connected in fluid communication with one of the conduits, said socket assembly including a socket body in which said socket chamber is at least partially disposed, a plurality of movable locking elements disposed on said socket body, said locking elements being movable between a disengaged condition in which said locking elements are disposed a first distance from a central axis of said socket body, a partially engaged condition in which said locking elements are disposed a second distance from the central axis of said socket body, and a fully engaged condition in which said locking elements are disposed a third distance from the central axis of said socket body, said first distance being greater than the outside radius of said first annular stop surface on said plug body so that said locking elements are ineffective to grip said plug body when said locking elements are in the disengaged condition, said second distance being smaller than the first distance and the outside radius of said first annular stop surface on said plug body so that said locking elements can engage said first stop surface on said plug body when said locking elements are in the partially engaged condition, said second distance being greater than the outside radius of said second annular stop surface on said plug body so that the elements are spaced from said second stop surface on said plug body when said locking elements are in the partially engaged condition, said third distance being smaller than the outside radius of said second annular stop surface on said plug body so that said locking elements can engage said second stop surface on said plug body when said locking elements are in the fully engaged condition, biasing means for urging said locking elements toward said fully engaged condition, first and second stage sleeves axially movable relative to said socket body and to each other, said first stage sleeve being movable relative to said socket body from an extended position to a partially retracted position to move said locking elements from said fully engaged condition to said partially engaged condition to release said plug body for axial movement relative to said socket body from a first position in which said locking elements engage said second stop surface on said plug body to a second position in which said locking elements engage said first stop surface on said plug body, said first stage sleeve being movable relative to said socket body from said partially retracted position to a fully retracted position to move said locking elements from the partially engaged condition to the disengaged condition to release said plug body for axial movement relative to said socket body from said second position to a position in which said plug body is spaced apart from said socket body, said second stage sleeve being movable relative to said socket body between an extended position and a retracted position, said second stage sleeve including stop surface means for blocking movement of said first stage sleeve from said partially retracted position to said fully retracted position when said second stage sleeve is in its extended position, said stop surface means on said second stage sleeve being ineffective to block movement of said first stage sleeve to its fully retracted position when said second stage sleeve is in its retracted position, seal means for sealingly engaging said plug body to prevent leakage of fluid when said locking elements are in their fully engaged condition and are in engagement with said second stop surface on said plug body, said seal means being ineffective to prevent leakage of fluid when said locking elements are in their partially engaged condition and are in engagement with said first stop surface on said plug body to enable fluid to leak along a flow path extending between said plug and socket bodies to thereby reduce the fluid pressure in said socket body, and actuator means connected with said socket body for operating said check valve in said plug body from the closed condition to the open condition when said locking elements are in the fully engaged condition and said seal means is in sealing engagement with said plug body.

2. A connector assembly as set forth in claim 1 wherein said actuator means includes an elongated member disposed in said socket body and having an axial extent which is sufficient to enable said actuator means to engage said check valve and move said check valve from the closed condition to the open condition upon operation of said actuator means with said locking elements in engagement with said second stop surface on said plug body, said elongated member having an axial extent which is insufficient to move said check valve from the closed condition to the open condition upon operation of said actuator means with said locking elements in engagement with said first stop surface on said plug body.

3. A connector assembly as set forth in claim 1 wherein said actuator means includes a cam rotatable about an axis which extends transversely to the central axis of said socket body, a cam follower which is movable axially relative to said socket body and has a first end portion and a seond second end portion which engages said cam, an elongated member extending axially from the first end portion of said cam follower, said cam having surface means for applying force against the second end portion of said cam follower to move said cam follower relative to said socket body, said elongated member having end surface means for applying force against said check valve to operate said check valve from the closed condition to the open condition upon movement of said cam follower by said cam.

4. A connector assembly as set forth in claim 3 further including biasing means for pressing said cam follower against said cam with a force sufficient to rotate said cam and return said actuator means to its initial condition upon release of said actuator means.

5. A connector assembly as set forth in claim 1 wherein said actuator means includes a handle movable from a first position to a second position to operate said check valve from the closed condition to the open condition, said handle having surface means which blocks movement of said first stage sleeve from the partially retracted position to the fully retracted position when said handle is in the second position.

6. A connector assembly as set forth in claim 1 further including biasing means for applying force against said second stage sleeve urging said second stage sleeve toward its extended position, said biasing means including a fluid pressure chamber at least partially disposed outside of said socket body and means for conducting fluid pressure from said socket chamber to said pressure chamber when said check valve is in the open condition.

7. A connector assembly as set forth in claim 1 wherein locking elements include a plurality of pin members having longitudinal axes extending transversely to the central axis of said socket body.

8. A connector assembly for use in connecting a pair of conduits in fluid communication, said connector assembly comprising a plug assembly having a plug body adapted to be connected with one of the conduits and a check valve disposed in said plug body, said check valve being operable between a closed condition blocking fluid flow through said plug body and an open condition enabling fluid to flow through said plug body, and a socket assembly, said socket assembly including a socket body having a chamber into which said plug body is insertable a first distance to a partially engaged position and a second distance to a fully engaged position, locking means operable between a release condition in which said locking means is ineffective to prevent withdrawal of said plug body from said socket chamber, a first locking condition in which said locking means blocks withdrawal of said plug body from said socket chamber when said plug body is in the partially engaged position and a second locking condition in which said locking means blocks withdrawal of said plug body from said socket chamber when said plug body is in the fully engaged position, seal means for blocking leakage of fluid when said plug body is in the fully engaged position and for allowing leakage of fluid when said plug body is in the partially engaged position, and actuator means for operating said check valve from the closed condition to the open condition when said plug body is in the fully engaged position, said actuator means being ineffective to operate said check valve from the closed condition to the open condition when said plug body is in the partially engaged condition so that said check valve can be opened by said actuator means only when said seal means is blocking leakage of fluid, said actuator means including an elongated member disposed in said socket body and having an axial extent which is sufficient to enable said actuator means to engage said check valve and move said check valve from the closed condition to the open condition upon operation of said actuator means with said plug body in the fully engaged position, said elongated member having an axial extent which is insufficient to move said check valve from the closed condition to the open condition upon operation of said actuator means with said plug body in the partially engaged condition.

9. A connector assembly as set forth in claim 8 further including pressure responsive means for opposing operation of said locking means from the first locking condition to the release condition with a force which varies as a function of the fluid pressure in a portion of said socket body to prevent disengagement of said plug body from said socket body when there is a relatively large fluid pressure in said socket body.

* * * * *